United States Patent
Senzaki

(10) Patent No.: US 6,672,809 B2
(45) Date of Patent: Jan. 6, 2004

(54) TOOL HOLDER AND COOLING APPARATUS THEREFOR

(75) Inventor: Chikara Senzaki, Nara (JP)

(73) Assignee: Manyo Tool Kabushiki Kaisha, Nara-Ken (JP)

( * ) Notice: Subject to any disclaimer, the term of this patent is extended or adjusted under 35 U.S.C. 154(b) by 0 days.

(21) Appl. No.: 09/921,730

(22) Filed: Aug. 3, 2001

(65) Prior Publication Data

US 2002/0034427 A1 Mar. 21, 2002

(30) Foreign Application Priority Data

Sep. 19, 2000 (JP) .................................. 2000-283338

(51) Int. Cl.[7] .......................... B23C 9/00; B23B 27/10
(52) U.S. Cl. ...................... 409/136; 409/135; 408/57; 408/58
(58) Field of Search .......................... 409/135, 136; 608/57, 58

(56) References Cited

U.S. PATENT DOCUMENTS

| | | | | |
|---|---|---|---|---|
| 3,893,355 A | * | 7/1975 | Maastricht | 82/137 |
| 3,993,297 A | * | 11/1976 | Tokunaga | 269/54.5 |
| 4,019,846 A | * | 4/1977 | Greenberger | 425/194 |
| 4,103,588 A | * | 8/1978 | Schmid | 407/120 |
| 4,573,836 A | * | 3/1986 | Andersson | 408/59 |
| 4,620,824 A | * | 11/1986 | Eckstein et al. | 408/124 |
| 4,757,307 A | * | 7/1988 | Keramati et al. | 340/680 |
| 4,795,292 A | * | 1/1989 | Dye | 409/136 |
| 4,992,012 A | | 2/1991 | Cioci | |
| 5,133,629 A | * | 7/1992 | Pfalzgraf et al. | 409/232 |
| 5,244,322 A | * | 9/1993 | Schweizer et al. | 409/233 |
| 5,439,333 A | * | 8/1995 | Kubo | 409/136 |
| 5,672,035 A | * | 9/1997 | Pawlik | 384/900 |
| 5,799,553 A | * | 9/1998 | Billatos | 407/11 |
| 5,890,849 A | * | 4/1999 | Cselle | 408/1 R |
| 5,993,297 A | * | 11/1999 | Hyatt | 451/53 |

FOREIGN PATENT DOCUMENTS

| | | |
|---|---|---|
| DE | 23 46 480 A | 4/1975 |
| DE | 34 47 932 A | 9/1985 |
| FR | 1 173 190 A | 2/1959 |
| JP | 07314273 | 12/1995 |
| JP | 11320213 | 11/1999 |

\* cited by examiner

Primary Examiner—William Briggs
Assistant Examiner—Dana Ross
(74) Attorney, Agent, or Firm—Graybeal Jackson Haley LLP

(57) ABSTRACT

The holder body of a tool holder includes one or more first fluid passages and one or more second fluid passages, wherein the first and second fluid passages are communicated to each other inside the holder body and open to the outer surface of the holder body. A cooling fluid is supplied from a fluid passage formed in a fluid guide of the cooling apparatus to either the first fluid passage or the second fluid passage, flows through a communicating portion of the first and second fluid passages into the other of the first and second fluid passages, and runs out into the other fluid passage of the fluid guide.

5 Claims, 7 Drawing Sheets

TOOL HOLDER AND COOLING APPARATUS THEREFOR

BACKGROUND OF THE INVENTION

1. Field of the Invention

The present invention relates to a so-called tool holder to be used for mounting a tool, a workpiece and the like on a proper machine and instrument such as a machine tool and a cooling apparatus for the tool holder.

2. Description of Prior Art

A tool holder is generally assembled into a proper machine and instrument such as a machine tool (hereinafter to be called "machine tool") in a state that the tool or the workpiece is attached to the tool holder. Consequently, the tool holder is subjected to a temperature up by a temperature rising of a workpiece due to machining of the workpiece. Particularly, in case of friction welding, the temperature of a tool or a workpiece rises to 1000° C. or so, resulting in a temperature up of a tool holder used for such friction welding to about 500 to 700° C.

When the temperature of a tool holder becomes high as mentioned above, a heating value to be transmitted from such a tool holder to the rotation shaft of a machine tool equipped with the tool holder increases, the rotation shaft is heated, and as a result, a bearing supporting the rotation shaft as well as lubricant oil disposed in the bearing is heated, lowering their functions.

It is, therefore, an object of the present invention to effectively control a rise in temperature of a tool holder.

SUMMARY OF THE INVENTION

The tool holder according to the present invention comprises a holder body. The holder body includes one or more first fluid passages and one or more second fluid passages. The first and second fluid passages are communicated to each other inside the holder body and open in the outer surface of the holder body.

A cooling fluid such as cooling water and cooling oil is supplied to either the first fluid passage or the second fluid passage and flows through the communicating portion of the first and second fluid passages into the other of the first and second fluid passages, finally to run out of the holder body.

The cooling apparatus of the present invention comprises a fluid guide for guiding the cooling fluid to a tool holder. The tool holder includes a holder body having one or more first fluid passages and one or more second fluid passages. The first and second fluid passages are communicated to each other inside the tool holder and open to the outer surface of the holder body. The fluid guide includes a fitting hole into which the holder body is rotatably fitted, a third fluid passage communicated to the first fluid passage and a fourth fluid passage communicated to the second fluid passage.

In the foregoing cooling apparatus, the cooling fluid is supplied from either the third fluid passage or the fourth fluid passage to either the first fluid passage or the second fluid passage, flows through the communicating portion of the first and the second fluid passages into the other of the first and the second fluid passages, finally to run out into the other of the third and fourth fluid passages.

As mentioned above, according to the tool holder and the cooling apparatus therefor, the tool holder is cooled by the cooling fluid passing the first and the second fluid passages to effectively control its temperature rising.

The first and second fluid passages can be communicated at the central portion of an imaginary circle extending about the axis of the holder body. By doing so, the cooling fluid flows to the center of the holder body, and the center is cooled by the cooling fluid, so that the tool holder is effectively cooled, and a rise in its temperature is more effectively controlled.

The area where the first and second fluid passages are formed has an outer periphery, and the first and second fluid passages can open to the outer periphery of the area. Thereby, supplying and discharging of the cooling fluid relative to the first and second fluid passages can be done from the outer periphery side of the area.

Each of the first and second fluid passages can include a plurality of fluid passages extending in the radial direction of an imaginary circle extending about the axis of the holder body and communicated to each other at the central portion of the imaginary circle. Thereby, since the holder body is cooled over a wide range within a cross section orthogonal to its axis, heat insulation is done effectively in the holder body, which remarkably reduces the heating value transmitted to the rotation axis attaching the tool holder.

In the cooling apparatus, the area of the holder body where the first and second fluid passages are formed has an outer periphery, the first and second fluid passages open, and the fluid guide can be provided with a first groove extending around the area and opening into the fitting hole so as to have the third fluid passage communicate to the first fluid passage, and with a second groove extending around the area and opening into the fitting hole so as to have the fourth fluid passage communicate to the second fluid passage. This facilitates making the first and second grooves for having the first and second fluid passages respectively communicate to the third and fourth fluid passages.

The cooling apparatus can further include a plate-like ring disposed in the fluid guide on the side where the tool is mounted on the holder body, part of the holder body extending through the ring. The ring can include an annular fluid passage extending around the part of the holder body and opening to the side of the fluid guide. Further, the fluid guide can include a first communicating passage for communicating the first fluid passage and the annular fluid passage, and a second communicating passage for communicating the second fluid passage to the annular fluid passage. This enables to absorb part of the heat transmitted from the tool to the fluid guide, to cool the fluid guide by the fluid flowing in the annular fluid passage, thereby cooling the fluid guide, too, effectively.

The cooling apparatus can further include a first and a second nipples connected with the fluid guide so as to have the third and fourth fluid passages respectively communicate to a fluid supply passage and a fluid discharge passage, and a block having a first and a second fitting holes into which the first and the second nipples are fitted. This enables to mount the cooling apparatus on the machine tool by pre-assembling the block into the machine tool and then fitting the nipples into the block.

The holder body can be rotatably received in the fluid guide by the bearing at a position on the side opposite to the tool from the area where the first and second fluid passages are formed, thereby protecting the bearing and the lubricant oil disposed therein from the heat of the tool.

BRIEF OF THE DRAWINGS

PREFERRED EMBODIMENT OF THE INVENTION

Figure 1:
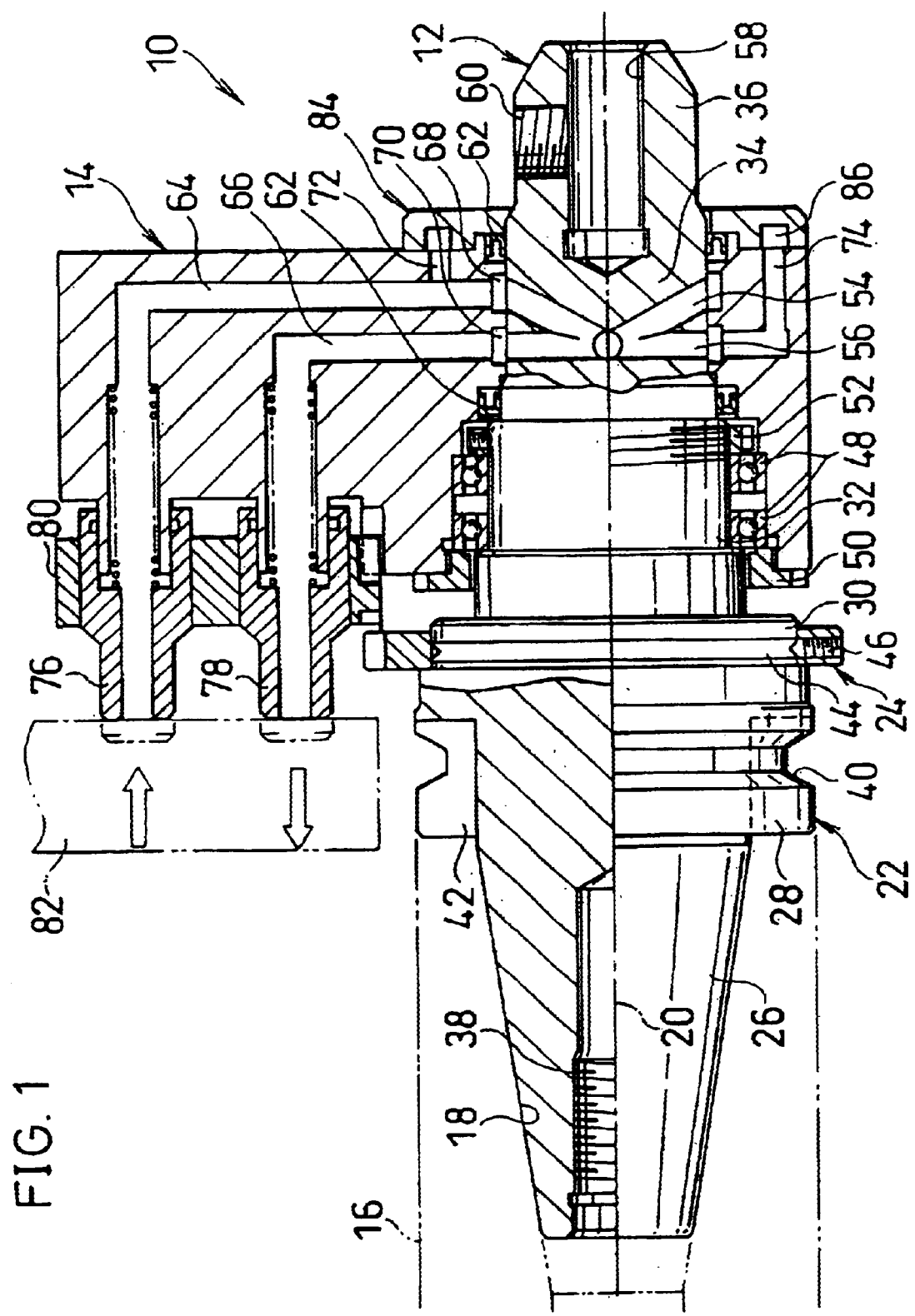
FIG. 1 is a sectional view showing one embodiment of the tool holder and the cooling apparatus of the present invention.
Figure 2:
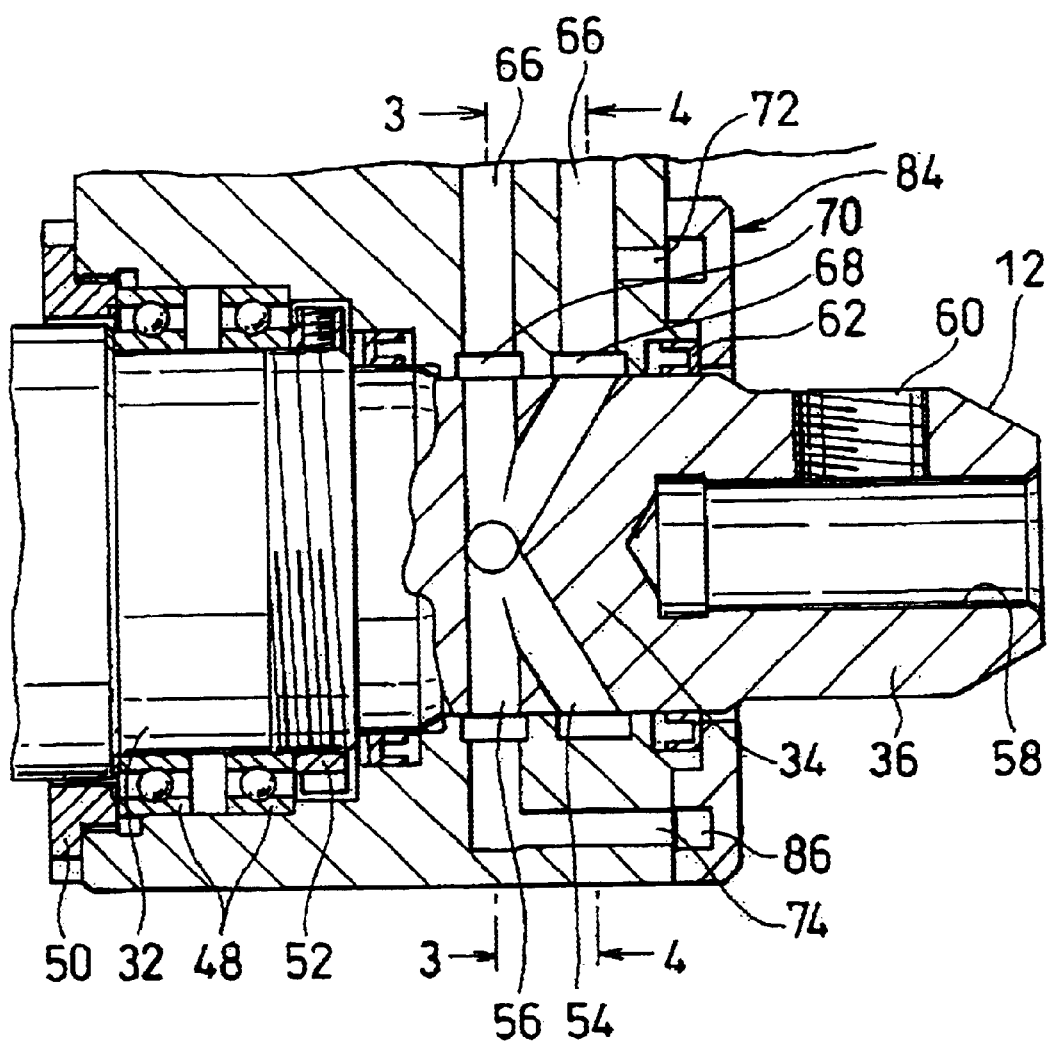
FIG. 2 is an enlarged sectional view of an essential part of the tool holder and the cooling apparatus in FIG. 1.
Figure 3:
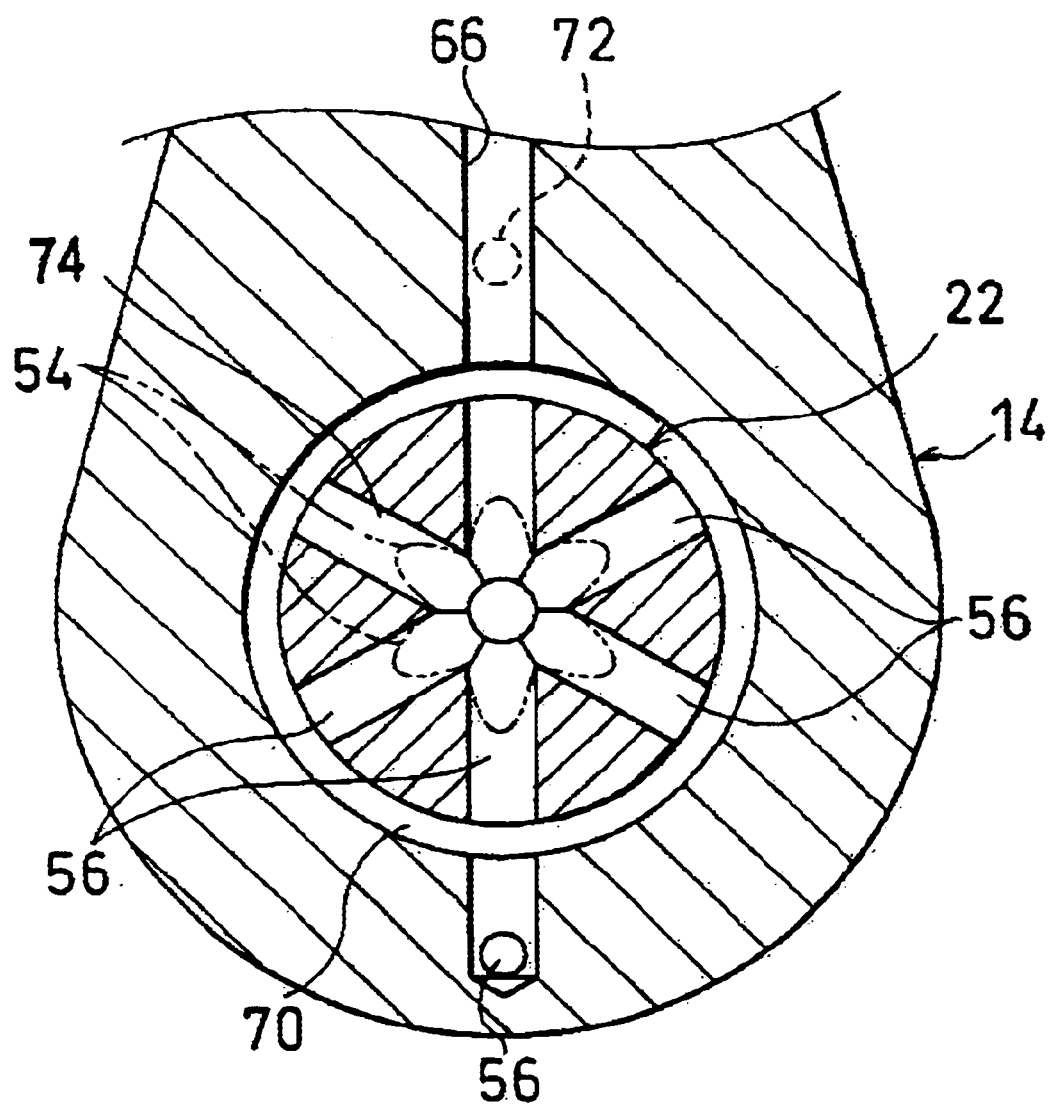
FIG. 3 is a sectional view obtained along line 3—3 in FIG. 2.
Figure 4:
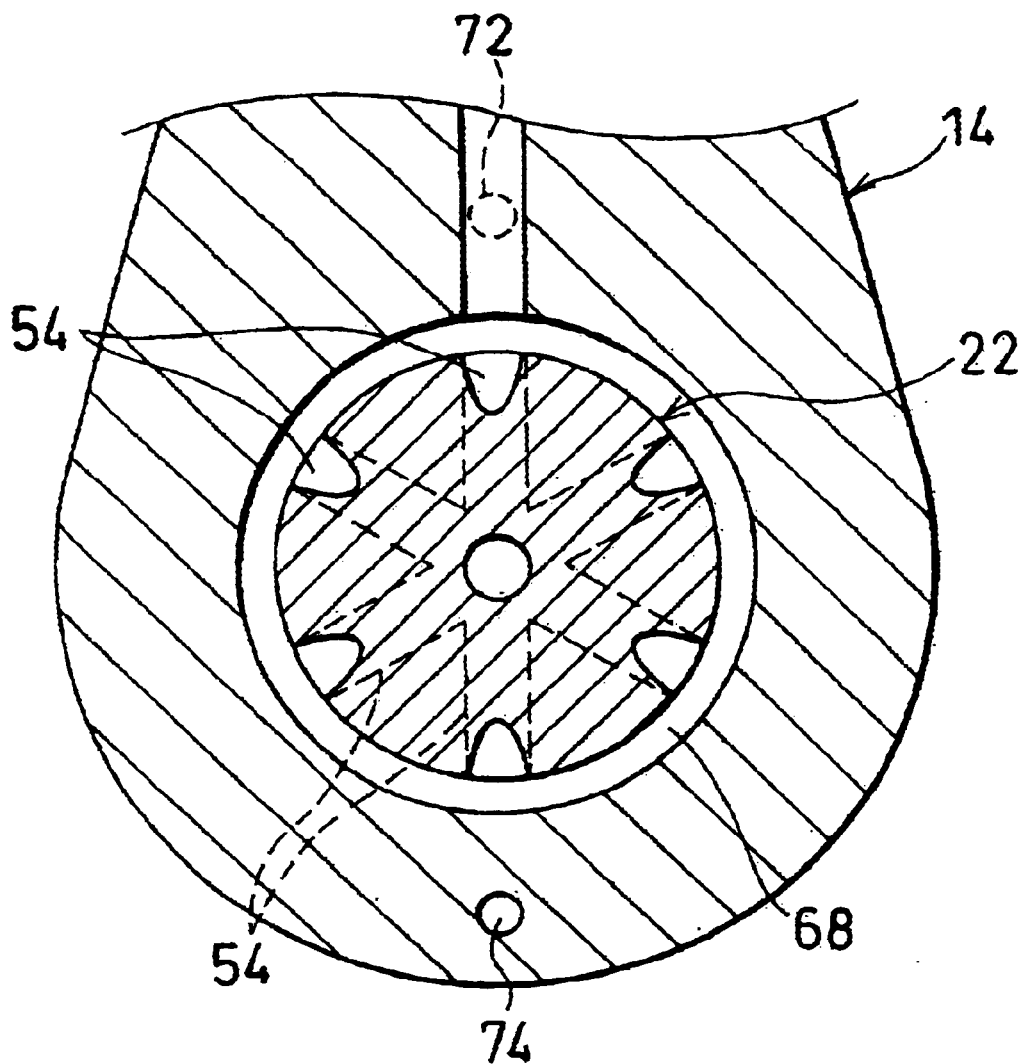
FIG. 4 is a sectional view obtained along line 4—4 in FIG. 2.
Figure 5:
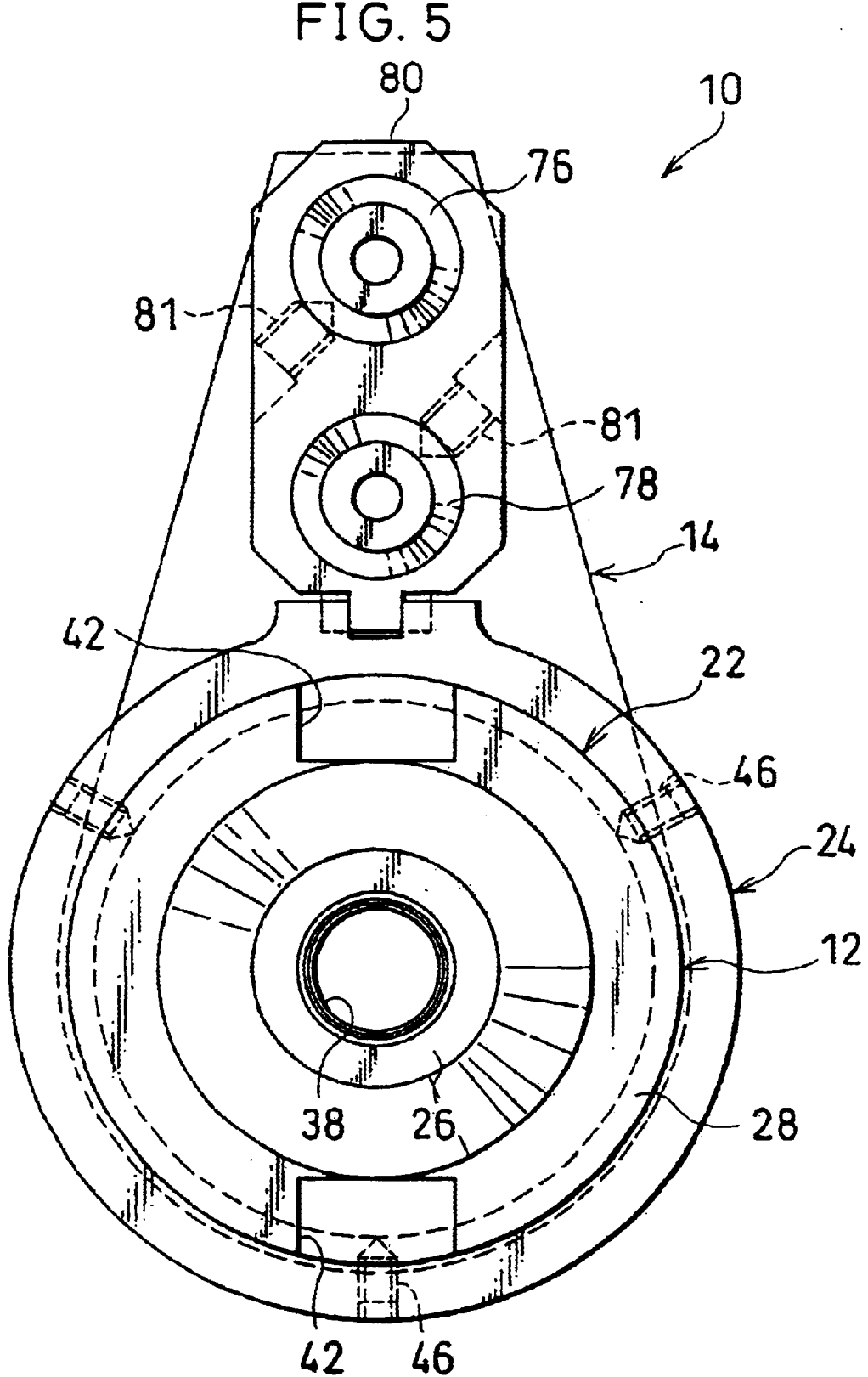
FIG. 5 is a left side view of the tool holder and the cooling apparatus in FIG. 1.

Referring to FIG. 1 through FIG. 5, a cooling apparatus 10 is used as a device to cool a so-called tool holder 12 for mounting a rotational tool and/or a workpiece on a machine tool and includes a fluid guide 14 for guiding a cooling fluid to the tool holder 12.

On the other hand, a rotation shaft 16 of the machine tool has a hole coaxially extending therethrough. One end portion of this hole is a hole portion 18 for removably assembling the tool holder 12. The hole portion 18 has a truncated conical shape whose diametral dimension increases toward the end face side of the rotation shaft 16.

The tool holder 12 is attached to the rotation shaft 16 such that the axis 20 of the tool holder 12 coincides with the axis of the rotation shaft 16. The tool holder 12 comprises a holder body 22, on which a tool is to be mounted, and a positioning ring 24 disposed on the holder body 22.

The holder body 22 has a shank area 26 to be inserted into the hole portion 18 of the rotation shaft 16, a flange portion 28 integrally following the shank area 26, a ring mounting area 30 integrally following the flange portion 28 so as to mount the ring 24, a guide mounting area 32 integrally following the ring mounting area 30 so as to mount a cooling guide 14, a cooling area 34 integrally following the guide mounting area 32 cooled by a fluid so as to control heat transmission to the side of the shank area 26, and a tool mounting area 36 integrally following the cooling area 34 so as to mount the tool respectively coaxially.

The shank area 26 has a truncated conical shape similar to the hole portion 18 and has a screw hole 38 open to the end face. The flange portion 28 is a gripping flange portion to be gripped by a tool exchanger and has an annular groove 40 which is V-shaped in section to be gripped by gripping claws of the tool exchanger as well as a plurality of recesses 42 for receiving projected portions (drive keys) of the rotation shaft 16 in predetermined positions in the circumferential direction so as to receive the rotation of the rotation shaft 16.

The ring mounting area 30 has an annular groove 44 with a V-shaped section on the outer periphery. The ring 24 is assembled into the ring mounting portion 38 by a plurality of lockscrews 46 screwed into a predetermined position from radially outward to reach the annular groove 44.

The diametral dimension of the guide mounting area 32 is divided into plural portions. The fluid guide 14 has a through hole, which the guide mounting area 32 and the cooling area 34 penetrate, and is received by the guide mounting area 32 so as to rotate relatively by a plurality of bearings 48 disposed in this through hole. The bearings 48 are maintained in a predetermined state by means of a screw ring 50 screwed into the fluid guide 14 and a screw ring 52 screwed into the guide mounting area 32.

In the cooling area 34, two kinds of fluid passages 54 and 56 are formed. In the illustration, the fluid passages 54, 56 are respectively formed from six passages at equal angular intervals about the axis 20 and extend in the radial direction of an imaginary circle extending about the axis 20.

The fluid passages 54, 56 are communicated to each other in the central portion of the imaginary circle and open to the outer periphery of the cooling area 34. The opening points of the fluid passages 54, 56 in the outer periphery of the cooling area 34 are spaced apart in the direction of the axis 20.

The tool mounting area 46 is constituted such that the shaft portion of a proper tool is received in a mounting hole 58 and attached removably by a screw member (not shown) such as a bolt to be screwed into a screw hole 60.

The space between the cooling area 34 and the fluid guide 14 is air-tightly or liquid-tightly sealed by a pair of seals 62 disposed between them. The seals 62 can be airtight seals when the cooling fluid to be used is a gas such as the air and liquid-tight seals when it is a liquid such as water.

The fluid guide 14 includes fluid passages 64 and 66 individually communicated to the fluid passages 54 and 56 of the holder body 22; annular grooves 68 and 70 which extend around the cooling area 32 so as to individually communicate the fluid passages 64 and 66 to the fluid passages 54 and 56 and open into the fitting hole of the fluid guide 14; and communicating passages 72 and 74 individually communicated to the fluid passages 64 and 66. The fluid passages 64 and 66 are respectively communicated to nipples 76 and 78. The communicating passages 72, 74 open to the tool side face of the fluid guide 14.

The nipples 76, 78 are assembled by a screw 81 (see FIG. 5) into a support block 80 which is removably assembled into the fluid guide 14, and fitted at end portions into a combining block 82 separably assembled into the machine tool. The combining block 82 has a fluid supply passage and a fluid discharge passage (neither is shown). The fluid supply passage and the fluid discharge passage are respectively communicated to the fluid passages 64 and 66 through the nipples 76 and 78.

The cooling apparatus 10 can be mounted on to the machine tool by pre-assembling the combining block 82 into the machine tool and fitting the nipples 76, 78 into the combining block 82.

A plate-like ring 84 is assembled into the face of the fluid guide 14 on the side of the tool mounting area 36 by a plurality of screw members. The cooling area 34 of the holder body 22 penetrates the ring 84, and the ring 84 has an annular fluid passage 86 extending around the cooling area 34 and opening to the side of the fluid guide 14. The fluid passage 86 is communicated to the fluid passages 64 and 66 by the communicating passages 72 and 74 of the fluid guide 22.

Cooling fluid such as the air, cooling water and cooling oil is supplied from the nipple 76 to the fluid passage 64 of the fluid guide 14, flowed from the fluid passage 64 to the groove 68 and the fluid passage 54, and further runs out into the communicating portion of the fluid passages 54, 56, the fluid passage 56, the groove 70, the fluid passage 66 and the nipple 78.

Consequently, since the cooling area 34 of the holder body 22 is cooled due to flowing of the cooling fluid in the fluid passages 54, 56, the heat transmitted from the tool to the tool mounting area 36 is absorbed by the cooling fluid in the cooling area 34, thereby effectively controlling the temperature rise of the tool holder 12.

As a result, there is no fear that the bearings 48 and the lubricant oil disposed therein will be heated, and since the heating value to be transmitted from the tool mounting area 36 to the guide mounting area 32, the shank area 26 and further to the rotation shaft 16 is small, there is no fear that the bearings 48, the bearings supporting the rotation shaft 16 as well as the lubricant oil disposed therein will be heated.

Also, since the fluid passages 54 and 56 are respectively kept connected with the annular grooves 68 and 70, the cooling fluid is always flowing in the fluid passages 54, 56, thereby effectively controlling the temperature rise of the tool holder 12.

Part of the cooling fluid supplied to the fluid passage 64 flows from the communicating passage 72 to the fluid passage 86 of the ring 84 and returns from the communicating passage 74 to the fluid passage 66. Consequently, part of the heat transmitted from the tool to the fluid guide 14 is absorbed by the ring 84, and the fluid guide 14 is cooled by the fluid flowing in the fluid passage 86, so that the fluid guide 14 can also be effectively cooled.

When the fluid passages 54, 56 are communicated at the central portion of the imaginary circle extending about the axis 20, the cooling fluid flows to the center of the holder body 22, to be cooled by the cooling fluid. This enables the tool holder 12 to be effectively cooled to control the temperature rise more effectively.

Further, when each of the fluid passages 54, 56 includes a plurality of passages extending in the radial direction of the imaginary circle extending about the axis 20, the holder body 22 is cooled over a wide range within the section orthogonal to the axis 20. Thereby, heat insulation in the holder body 22 is effectively made, remarkably reducing the heating value to be transmitted to the rotation shaft 16 on which the tool holder 12 is mounted.

In the cooling apparatus 10, the fluid passages 54, 56 open to the outer periphery of the cooling area, and besides, the fluid passages 64 and 66 are respectively communicated to the fluid passages 54 and 56 by means of the grooves 68 and 70 extending around the cooling area 34 and opening into the fitting hole of the fluid guide 14, so that the grooves 68 and 70 communicating the fluid passages 54 and 56 respectively to the fluid passages 64 and 66 can be easily made.

The heat of the tool is transmitted also to the fluid guide 14 by radiation.

In the cooling apparatus 10, however, part of the heat to be transmitted from the tool to the fluid guide 14 is absorbed by the ring 84, and the fluid guide 14 is cooled by the fluid flowing in the fluid passage 86. As a result, the fluid guide 14 itself is also effectively cooled.

While the fluid passages 54, 56 are formed in the angular range of 360° about the axis 20 in the above embodiment, the fluid passages 54, 56 may be formed in the angular range of 180° about the axis 20.

Figure 6:
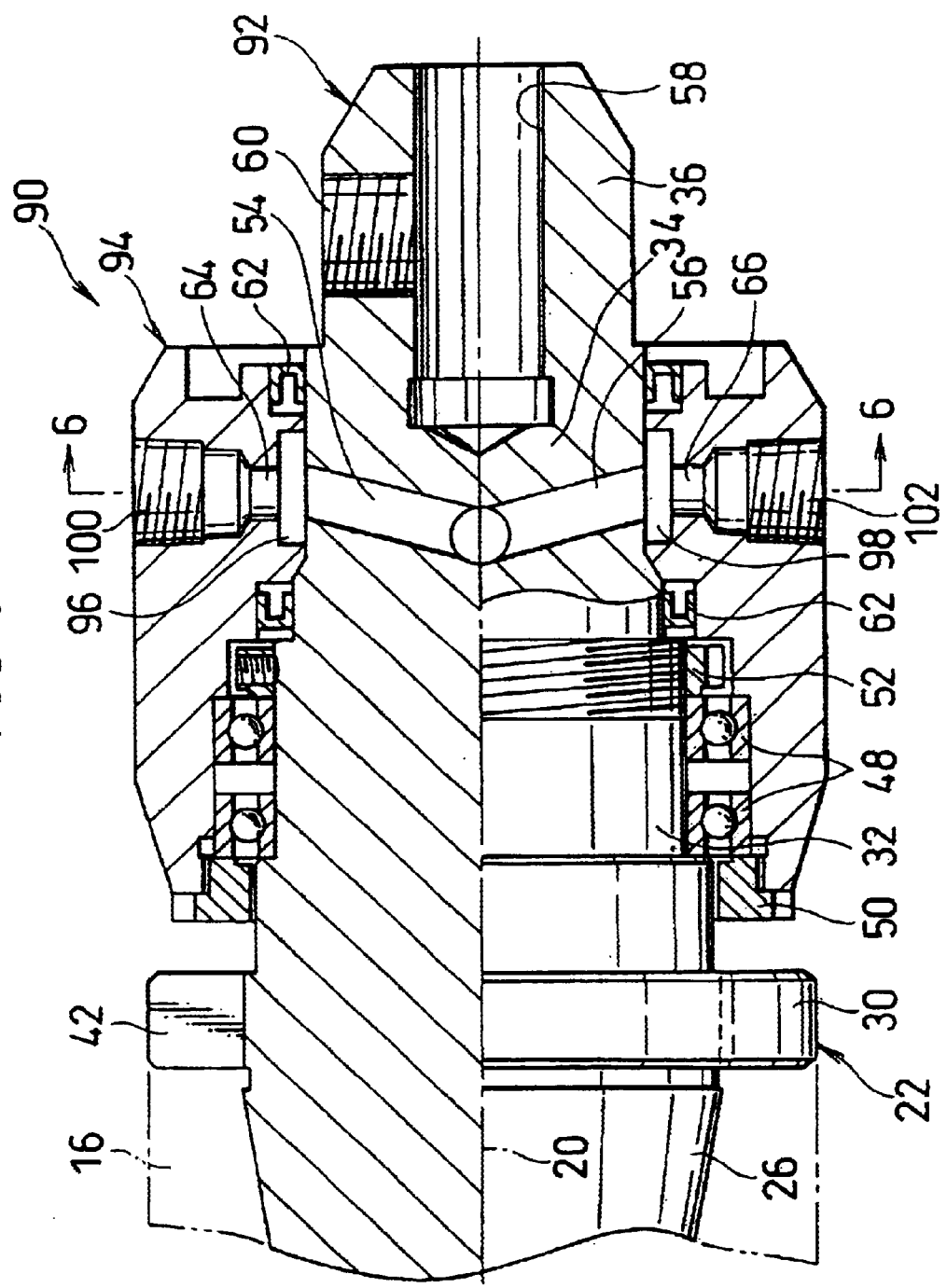
FIG. 6 is a sectional view showing another embodiment of the tool holder and the cooling apparatus of the present invention.
Figure 7:
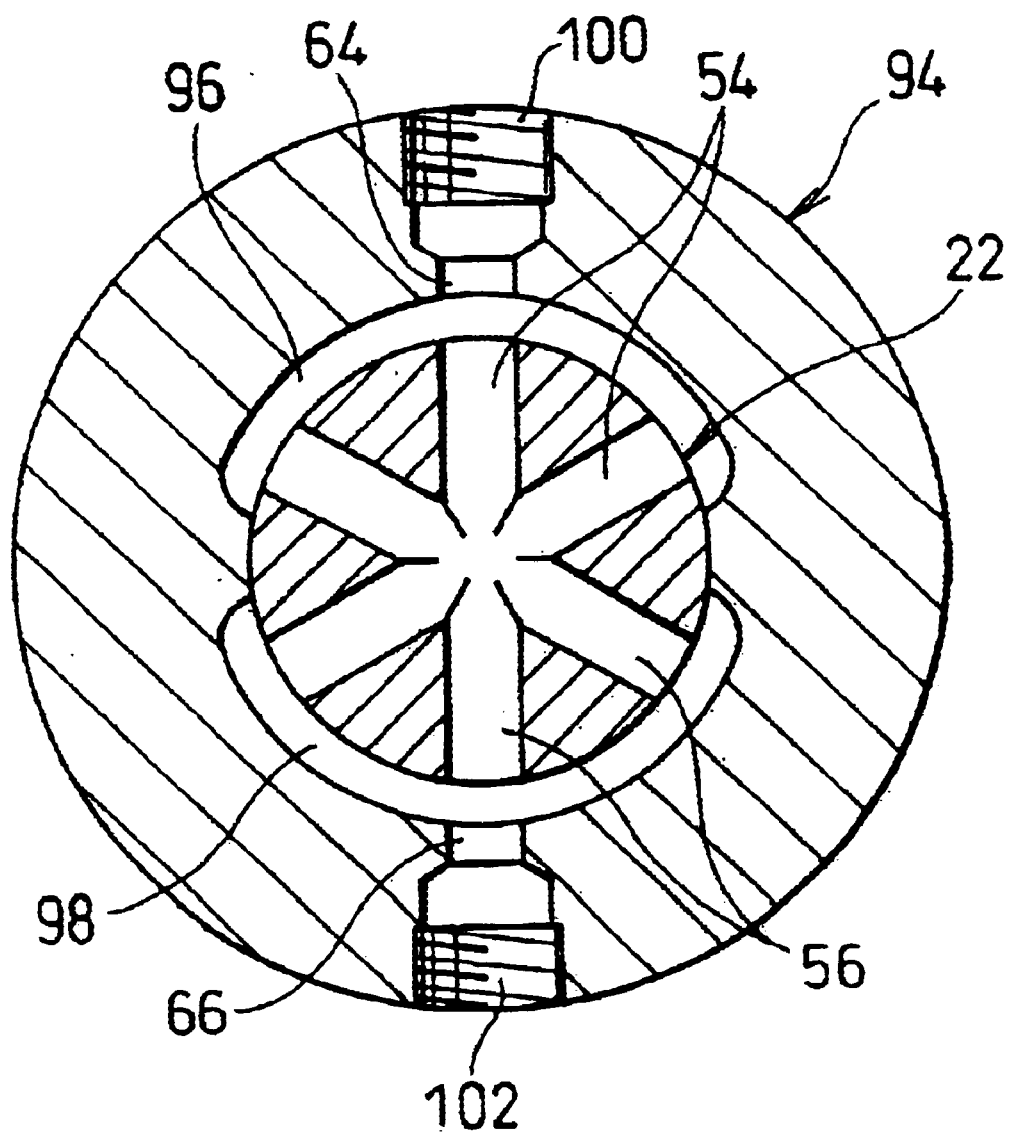
FIG. 7 is a sectional view obtained along line 7—7 in FIG. 6.

Referring to FIGS. 6 and 7, the cooling apparatus 90 comprises a fluid guide 94 for guiding a fluid to cool a tool holder 92. In the tool holder 92, the holder body 22 is formed in the same shape as the tool holder 12 in the foregoing embodiment except that three fluid passages 54 are formed at equal angular intervals over an angular range of less than 180° about the axis 20 and that the three fluid passages 56 are formed at equal angular intervals in the angular range of less than 180°.

The fluid guide 94 has a cylindrical shape, grooves 96 and 98 communicating the fluid passages 64 and 66 respectively to the fluid passages 54 and 56 are made arc-shaped grooves extending in an arc-like shape over an angular range of less than 180°. Also, the fluid guide 94 has connecting portions 100 and 102 for connecting the fluid passages 64 and 66 respectively to a fluid supply tube and a fluid discharge tube.

Also by the cooling apparatus 90, the heat to be transmitted from the tool to the tool mounting area 36 is absorbed by the cooling fluid in the cooling area 34, and the temperature rise of the tool holder 12 is effectively controlled.

While in any of the embodiments above the fluid passages of the holder body are opened to the outer periphery of the holder body, it is preferable to open the fluid passages in an outward face of the holder body for cooling the holder body efficiently, to simplify the structure of the fluid guide to guide the cooling fluid, to simplify the structure to prevent the fluid from leaking between the fluid guide and the holder body and so on. For example, it is possible to form the flange in the holder body and to open the fluid passages to a face in the direction of the thickness or the outer periphery of the flange.

The present invention is not limited to the above embodiments. The present invention can be modified in various ways without departing from its spirit.

What is claimed is:

1. A cooling apparatus for a tool holder, the tool holder comprising a holder body having at least one first fluid passage and at least one second fluid passage wherein first ends thereof fluidly communicate inside the holder body and second ends thereof terminate at an outer surface of the holder body, the cooling apparatus comprising:

a fluid guide for guiding a cooling fluid to the tool holder comprising a body defining a fitting hole for rotatably and removably receiving a portion of the holder body, and defining a first delivery passage having a first end in fluid communication with the at least one first passage at the outer surface of the holder body and a second delivery passage having a first end in fluid communication with the at least one second passage at the outer surface of the holder body, and further defining a first communicating passage having a first end in fluid communication with the first delivery passage and a second communicating passage having a first end in fluid communication with the second delivery passage; and an annular ring coaxially disposed about the fitting hole such that part of the holder body penetrates there through, wherein the ring defines an annular passage extending about the penetrating part of the holder body and is in fluid communication with the first and the second communicating passages.

2. A cooling apparatus as defined in claim 1, wherein the fluid guide body further defines a first groove circumscribing the holder body outer surface that is in fluid communication with the at least one first fluid passage, and a second groove circumscribing the holder body outer surface that is in fluid communication with the at least one second fluid passage.

3. A cooling apparatus as defined in claim 1, wherein the second communicating passage is located substantially diametrically opposed to the location of the first communicating passage.

4. A cooling apparatus as defined in claim 1, further including first and second nipples in fluid communication with respective first and second delivery passages, and a block having first and second fitting holes into which the first and second nipples are respectively fitted.

5. A cooling apparatus as defined in claim 1, wherein the holder body is rotatably received in the fluid guide by at least one bearing.

* * * * *